(12) United States Patent
Groth (10) Patent No.: US 6,981,835 B1
(45) Date of Patent: Jan. 3, 2006

(54) RECREATIONAL VEHICLE LOADING AND TRANSPORT PLATFORM FOR PICKUP TRUCKS

(76) Inventor: Calvin Douglas Groth, 1228 N. Long Rd., Greenacres, WA (US) 99016

( * ) Notice: Subject to any disclaimer, the term of this patent is extended or adjusted under 35 U.S.C. 154(b) by 0 days.

(21) Appl. No.: 11/097,703

(22) Filed: Apr. 4, 2005

(51) Int. Cl.
*B60P 7/08* (2006.01)

(52) U.S. Cl. .......................... 414/462; 414/537; 410/4; 410/7

(58) Field of Classification Search .............. 410/2–4, 410/7, 26, 77; 414/462, 537, 469; 224/403–404
See application file for complete search history.

(56) References Cited

U.S. PATENT DOCUMENTS

| | | | |
|---|---|---|---|
| 4,874,284 A | * | 10/1989 | New, Jr. ..................... 414/537 |
| 6,059,496 A | * | 5/2000 | Stevens ......................... 410/7 |
| 6,099,219 A | * | 8/2000 | Bartholomay ................ 410/20 |
| 6,705,820 B2 | * | 3/2004 | Schilling .................... 414/462 |

\* cited by examiner

*Primary Examiner*—Stephen Gordon
(74) *Attorney, Agent, or Firm*—Keith S. Bergman; William A. Jeckle (57) ABSTRACT

A recreational vehicle loading and transport platform for pickups provides a base mountable in a pickup box to pivotally carry a transport platform below the upper edges of the pickup box. The transport platform carries outrigger assemblies laterally of and depending below the upper edge of the pickup box to support outer support structures of recreational vehicles straddling the pickup box sides. A pneumatic cylinder moves the forward end of the transport platform vertically to responsively tilt the transport platform for loading and unloading of recreational vehicles. A loading and unloading ramp is removably secured to the rear end of the transport platform to move between use and storage positions.

5 Claims, 11 Drawing Sheets

RECREATIONAL VEHICLE LOADING AND TRANSPORT PLATFORM FOR PICKUP TRUCKS

RELATED APPLICATIONS

There are no applications related hereto heretofore filed in this or in any foreign country.

BACKGROUND OF INVENTION

1. Field of Invention

This invention relates to apparatus for loading and transporting recreational vehicles on a pickup truck box, and more particularly to such apparatus that simultaneously carries two elongately oriented and laterally adjacent recreational vehicles partially supported on outrigger assemblies outwardly of the pickup box sides.

2. Background and Description of Prior Art

For purposes of this Application the term "recreational vehicle" includes snowmobiles, 4 wheel all-terrain vehicles (ATV's) and similar off road vehicles.

Generally only one recreational vehicle can be accommodated in a conventional pickup truck box because of the width available between pickup box sides. This is a disadvantage and other means to carry two recreational vehicles at the same time have been developed, but these other means also have had inherent disadvantages.

Trailers have been used but are generally large, difficult to store, expensive to maintain and license, increase stopping distances, are difficult to maneuver especially in off road areas, and require additional parking space.

As an alternative, horizontal platforms disposed above the truck box and extending laterally beyond the pickup's sides, commonly known as raised decks, have been developed. Disadvantages of known raised decks include instability because of the higher center of gravity, decreased fuel mileage because of increased wind resistance, limited passage under overhead objects such as tree branches, garage doors and commercial drive-throughs, difficulty in loading and unloading recreational vehicles onto the raised decks because of the height, and no structural means to prevent lateral movement of a recreational vehicle in the event the pickup is in an accident because the raised deck is above the pickup box. Raised decks are also of a relatively permanent nature once installed and occasionally require modification of the pickup bed with fastening structures.

Loading recreational vehicles onto and off of raised decks has been done either with a crane-type apparatus that moves the recreational vehicle vertically and pivots it horizontally about a vertical axis, or with inclined ramps using vehicle's own powering system. Both of these methods have inherent risks that have resulted in serious injury to persons and damage to property. Crane type apparatus are dependent upon cables, pulleys, and other mechanical linkages that must securely attach to the recreational vehicle for support. Such components however are subject to mechanical wear and failure which may disrupt their function unexpectedly. When a snowmobile moves from an inclined ramp to a raised deck there is a position whereat the skis of the snowmobile are not in firm contact with either the inclined ramp or the raised platform and the snowmobile "teeters" on the apex of the transition area. When in this position the snowmobile and operator are at risk as the recreational vehicle may uncontrollably slide, pivot or move in an unintended direction.

The instant invention seeks to resolve these and other disadvantages inherent in known devices by locating a recreational vehicle transport platform within the box of a pickup below the top edges of the box sides and above the wheel well covers. The transport platform pivots adjacent the tailgate end to reduce the transition angle between the transport platform and loading ramp as the transport platform is inclined. The transport platform also carries outrigger assemblies outwardly of the pickup box sides to support the lateral structures of recreational vehicles to allow the recreational vehicles to straddle the pickup box sides.

The instant invention may be easily installed and removed from a pickup box by one person without specialized tools and requires no modification to the pickup. The invention as compared to similar prior art lowers the center of gravity of the load, reduces wind resistance responsively increasing stability and fuel mileage, and provides structural means to prevent recreational vehicles from moving laterally if the pickup is in an accident.

My invention does not reside in any of the foregoing features individually but rather in the synergistic combination of all of its structures, which necessarily give rise to the functions flowing therefrom as herein specified and claimed.

SUMMARY OF INVENTION

My invention provides a base positioned in the box of a pickup and carrying a pivoting transport platform on axles journaled by laterally opposed axle mounting arches secured to the rearward portions of the base and transport platform respectively. The transport platform and base are secured in the pickup truck box by forward and rearward securing mechanisms. The forward securing mechanism is formed by an elongate box beam with laterally extendable end pieces frictionally communicating with the inner sides of the pickup box, and the rearward securing mechanism comprises a rectilinear plate carrying two axially aligned spacedly adjacent pins that engage between the base and tailgate brackets of the truck box. A securing tower at the forward end portion of the base carries a pneumatic cylinder pivotally interconnected between the transport platform and the base to vertically pivot the transport platform.

The transport platform carries elongately extending outrigger assemblies outwardly of and below the top edges of the pickup box sides.

An angulated loading ramp extends rearwardly from the transport platform to carry at a medial position a transition angle decreasing structure and at a ground engaging end an extensile traction pad.

In providing such a device, it is:

A principal object to provide a recreational vehicle loading and transport platform to simultaneously carry two adjacent elongately positioned recreational vehicles on a pickup box.

A further object is to provide such a transport platform carried partially within the pickup box with support surfaces below the top edge of the pickup box sides.

A further object is to provide such a transport platform that carries outrigger assemblies laterally outward of the pickup box.

A further object is to provide such a transport platform wherein recreational vehicles carried by the transport platform straddle the upper sides of the pickup box.

A further object is to reduce the vertical height of the transported recreational vehicles to lower the center of gravity of the assemblage, reduce wind resistance, increase stability, and increase fuel mileage of the pickup.

A still further object is to provide such a transport platform that pivots spacedly adjacent its rearward end to decrease the transition angle between the loading ramp and the transport platform to increase safety of loading and unloading recreational vehicles.

A still further object is to provide such a transport platform that may be installed and removed by one person.

A still further object is to provide such a device that is of new and novel design, of a rugged and durable nature, of simple and economic manufacture and one that is otherwise well suited to the uses and purposes for which it is intended.

BRIEF DESCRIPTIONS OF DRAWINGS

In the accompanying drawings which form a part hereof and wherein like numbers of references refer to similar parts throughout.

DESCRIPTION OF PREFERRED EMBODIMENT

As used herein, the term "forward", its derivatives, and grammatical equivalents refers to the portion of the platform that is positioned forwardmost when the platform is installed in a pickup bed. The term "rearward", its derivatives, and grammatical equivalents refers to the portion of the platform closest to the tailgate portion of the pickup. The term "outer", its derivatives, and grammatical equivalents refers to the driver side or passenger-side of the pickup as opposed to the laterally medial portion of the pickup truck.

My recreational vehicle loading and transport platform for pickups is generally comprised of base 1 pivotally connected to transport platform 2, carrying at least one outrigger assembly 3 laterally outwardly of at least one pickup box side, tilting mechanism 4 to incline the transport platform 2 with respect to the base 1, forward securing mechanism 5 and rearward securing mechanism 6 to secure the base 1 in the pickup box, and ramp 7 for loading and unloading recreational vehicles.

Figure 1:
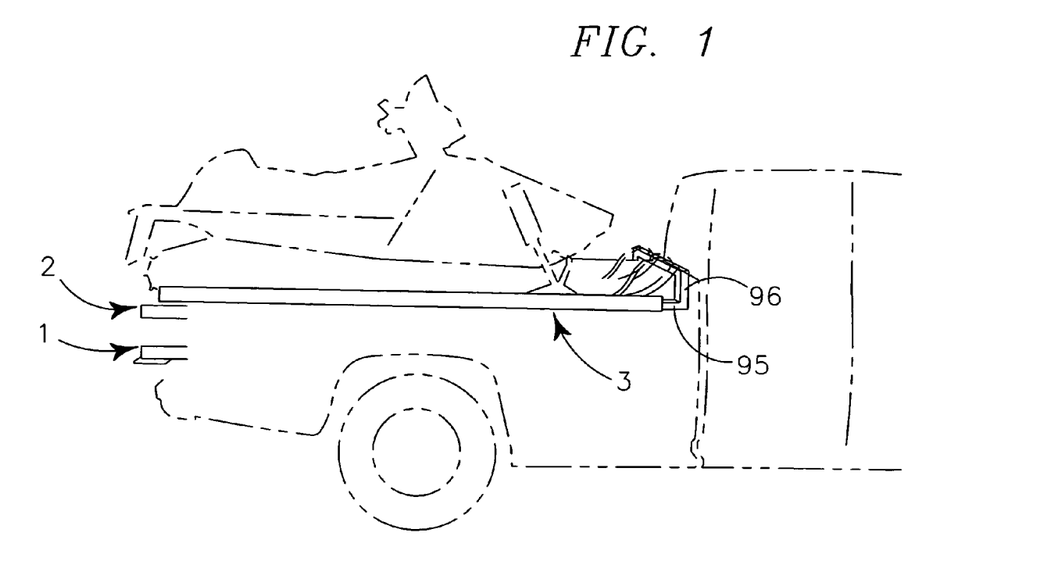
FIG. 1 is a partial orthographic right side view of a pickup box showing a phantom image of a snowmobile carried on the instant invention.
Figure 2:
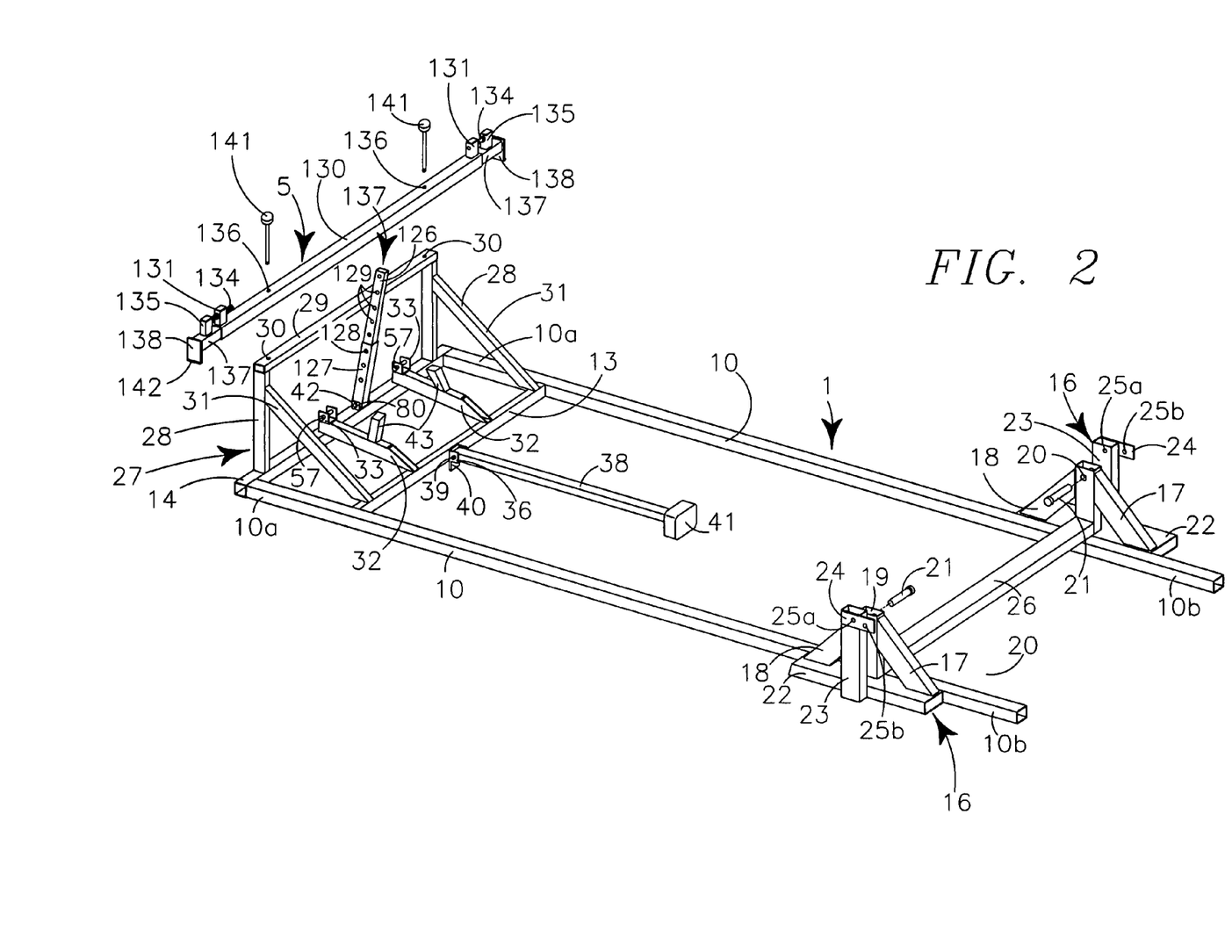
FIG. 2 is a left side forward looking isometric view of the base and forward securing mechanism.

As shown in FIG. 2 the base 1 is comprised of two parallel adjacent side beams 10 each having forward end portion 10a and rearward end portion 10b. Side beams 10, as illustrated, are box beams structurally interconnected by forwardmost crossbeam 14 and medial crossbeam 13 extending therebetween.

Spacer member 22 is structurally connected to the outer side of each side beam 10 spacedly adjacent the rearward end portion 10b and upwardly extending axle mounting arch 16 is structurally carried on the upper surface of the spacer member 22. The upwardly extending axle mounting arch 16 is comprised of rear angulated member 17, structurally attached to forward angulated member 18 by inner vertical member 19 supported on spacer member 22 so as to be disposed between the two angulated members 17 and 18. Orifice 20 for journaling bolt type axle 21 is defined in the upper portion of each vertical member 19 with axle 21 extending laterally therethrough. Crossbeam 26 is structurally attached between vertical members 19 to provide added strength and rigidity for the rearward portion of the base 1.

Outer vertical members 23, each carrying rearwardly extending rectilinear plates 24 adjacent their upper end portions are structurally carried by the outer surfaces of each spacer member 22. Two elongately spaced orifices 25a and 25b are defined in each rectilinear plate 24 to aid engagement with rear securing mechanism 6. Orifice 25a is aligned to carry pin 146 extending through both rectilinear plate 24 and the outer vertical member 23. Orifice 25b is positioned spacedly rearward of the outer vertical member 23.

Securing tower 27 is structurally carried to extend upwardly from the forward portion 10a of the base 1. The securing tower 27 is comprised of two forward vertical members 28 structurally carried by forwardmost crossmember 14 and in turn supporting upper horizontal member 29 extending therebetween and angulated members 31 extending between the forward vertical members 28 and medial crossbeam 13. The upper horizontal member 29 defines spaced orifices 30 inwardly adjacent each end to interconnect forward securing mechanism 5.

Two pneumatic cylinder supports 32 extend between the forwardmost crossbeam 14 and medial crossbeam 13. Each pneumatic cylinder support 32 carries a pair of pneumatic cylinder mounting brackets 33 which define orifices 34 to journal pneumatic cylinder mounting axles to pivotally carry pneumatic cylinders.

Elongate pivoting leg 38, to assist in the installation and removal of the base 1 and transport platform 2 into and from a pickup box, is carried on axle 39 journaled in axle mounting brackets 36 carried at a medial location on the rearward side of medial crossbeam 13. A rotation limitation stopper 40 which prevents the elongate leg 38 from rotating forwardly beyond vertical is structurally carried on the forward portion of the axle brackets 36 and extends therebetween parallel to axle 39. Rectilinear foot plate 41 is carried at the radially outer end of elongate leg 38 opposite axle 39 and has sufficient mass to bias elongate leg 38 into a vertical position against rotation limitation stopper 40.

Centering braces 43 are structurally carried on the upper surfaces of each pneumatic cylinder support 32. Centering braces 43 are angulated upwardly and inwardly to ensure the transport platform 2, when in its lowered position, is properly centered on the base 1 so that the outrigger assemblies 3 do not contact the pickup truck sides.

Figure 4:
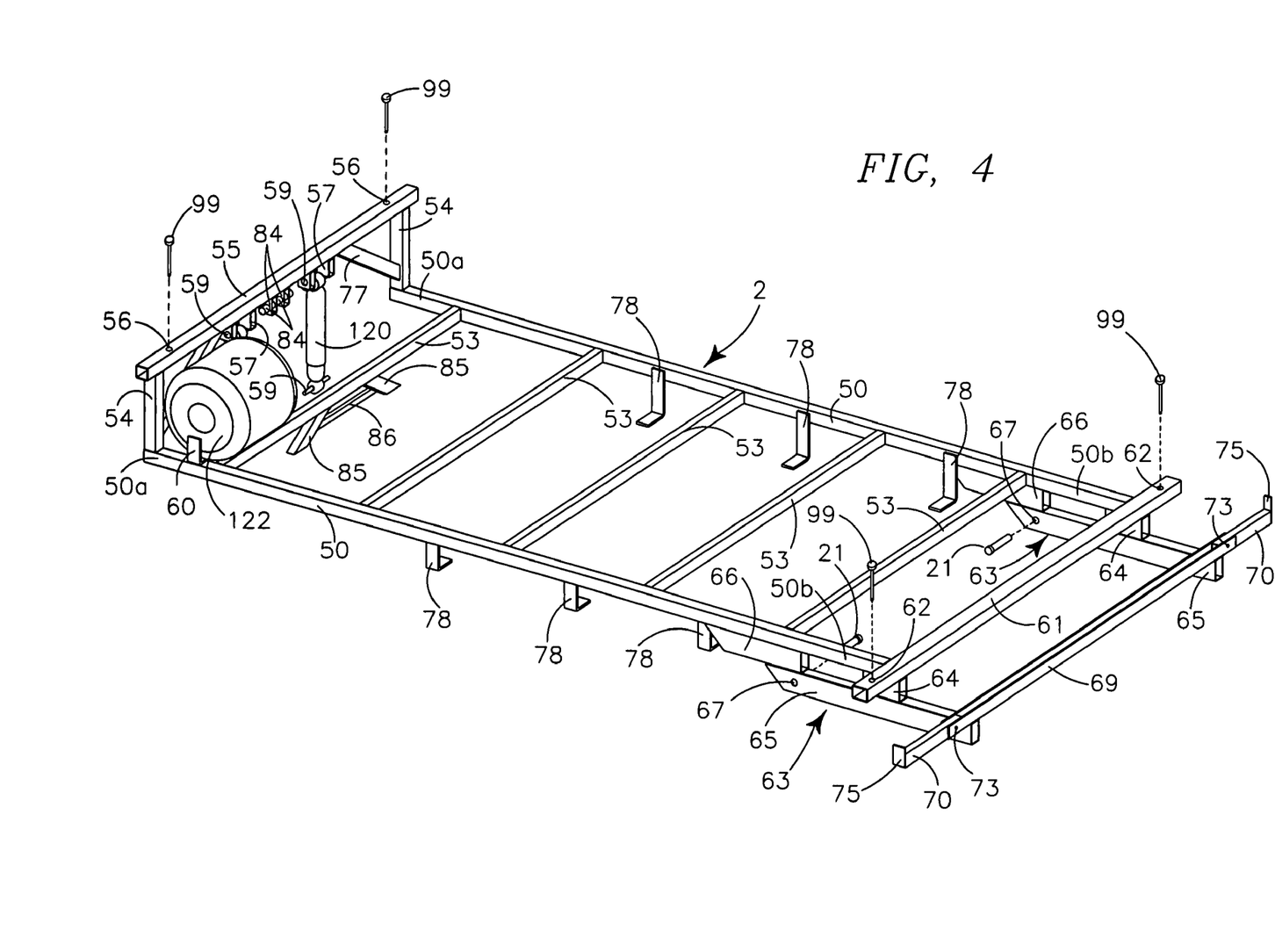
FIG. 4 is a left side forward looking isometric view of the transport platform without decking.

As shown in FIG. 4, transport platform 2 is formed by similar elongate box beams 50, having forward end portions 50a and rearward end portions 50b, interconnected in spaced adjacency by plural crossbeams 53 extending substantially perpendicularly therebetween. Plural "L" shaped ramp hangers 78 are carried in the elongately spaced array by beams 50 to depend therefrom with horizontal legs facing laterally inward to carry ramp 7 under transport platform 2.

Two upstanding vertical legs 54 are structurally carried by the forward end portions 50a of the beams 50. Forward outrigger support 55 structurally interconnects upper end portions of vertical legs 54 and extends laterally outwardly of each vertical leg 54. Angulated trusses 77 structurally communicate between forward outrigger supports 55 and vertical legs 54 to add strength to the joinder of these elements. Plural spaced orifices 56 are defined through forward outrigger support 55 to receive securing pins 99 extending therethrough. Pneumatic cylinder mounting brackets 57 that journal pneumatic cylinder mounting axle 59 depend from the medial portion of forward outrigger support 55.

Rear outrigger support 61 is structurally connected to the top surface at rearward end portions 50b of beams 50 to extend laterally outward of each beam 50. The rear outrigger support defines orifices 62 extending therethrough to carry securing pins 99 extending therethrough.

Depending axle mounting arch 63 provides similar side members comprising rear depending element 64 and forward depending element 66 carrying lower horizontal element 65 depending therefrom. The side members of the axle mounting arch 63 are structurally connected to the bottom of beams 50 adjacent the rearward end portions 50b. The lower horizontal member 65 extends substantially parallel to the associated beam 50 and rearwardly beyond the rearward end portion 50b of the associated beam 50.

Orifice 67 is defined in each lower horizontal member 65 spacedly rearward its forward end to extend laterally therethrough to carry bolt-type axle 21 which pivotally interconnects the axle mounting arch 63 of transport platform 2 to the upwardly extending axle mounting arch 16 of the base 1.

Ramp support 69 structurally interconnects the rear end portions of the opposed lower horizontal members 65. The ramp support 69 is a "U" beam which carries at first and second end portions pivoting beam extensions 70 that fit in the channel of the ramp support 69 and are pivotally mounted on bolt-type axles 73 extending therebetween. The pivoting beam extensions 70 may be pivoted upwardly and outwardly to extend the effective length of the ramp support 69. An upwardly extending flange 75 is structurally carried on the outer ends of the pivoting beam extensions 70 to prevent the ramp 7 from moving laterally outwardly to a position whereat it might fall off the extended pivoting beam extensions 70.

Deck 81 (FIG. 7) formed of expanded metal is releasably carried medially between beams 50 and on crossbeams 53 to extend the length of the transport platform 2 to provide support for the inward ground contacting elements of recreational vehicles.

Two centering braces 85, (FIG. 4) that angulate downwardly and outwardly to communicate with centering braces 43 of base 1, are structurally carried by forward crossbeam 53 of the transport platform 2 to depend therefrom to center transport platform 2 on base 1 when transport platform 2 is in a lowered position. Lowering stop 86 is structurally carried by the centering braces 85 to extend therebetween in a position such that when the transport platform is in a generally horizontal position, lowering stop 85 rests on upper end portions of centering braces 43 carried by base 1. Lowering stop 85 prevents the weight of transport platform 2 and recreational vehicles thereon from being carried by pneumatic cylinders 120 which might damage the pneumatic cylinders.

Figure 6:
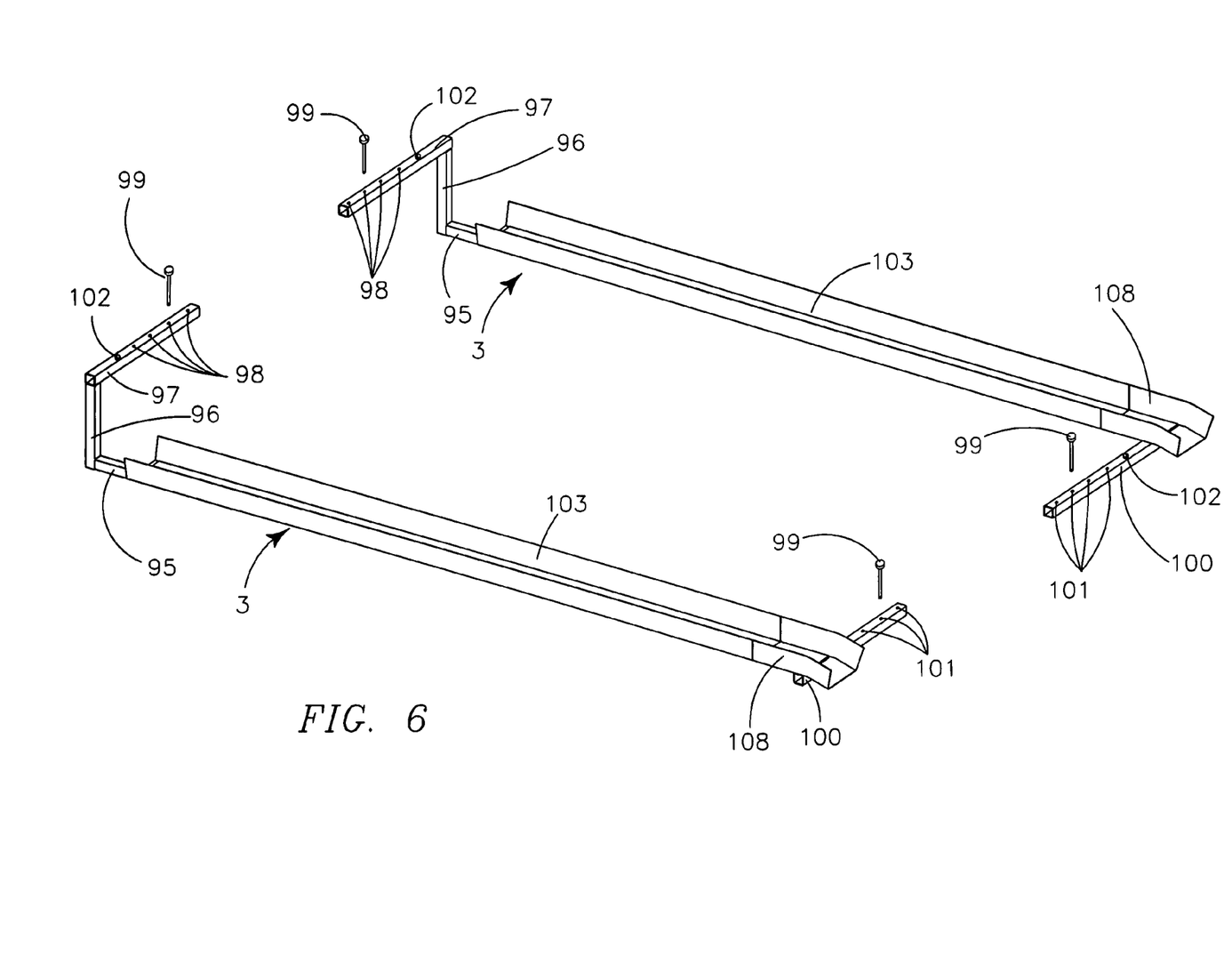
FIG. 6 is a left side forward looking isometric view of the two opposing outrigger assemblies isolated for clarity.

As shown in FIG. 6, transport platform 2 carries at least one and preferably two similar outrigger assemblies 3. Each outrigger assembly 3 provides elongate beam 95 having upward extending vertical leg 96 at a forward end. Upper end of vertical leg 96 carries forward horizontal leg 97 extending perpendicularly to vertical leg 96 and beam 95. The forward horizontal leg 97 is a box beam sized for slidable engagement with the interior channel of the forward outrigger support 55. Plural spaced orifices 98 are defined vertically through horizontal leg 97 to receive securing pin 99 extending through orifice 56 in forward outrigger support 55 and through orifice 98 in forward horizontal leg 97.

Rear horizontal leg 100 is structurally connected to rearward end portion of beam 95 to extend in the same direction and parallel to forward horizontal leg 97. The rear horizontal leg 100 is sized for slidable engagement in the interior channel of rear outrigger support 61 and defines plural spaced orifices 101 extending vertically therethrough to receive securing pin 99 extending through orifice 62 in rear outrigger support 61 and orifice 101 in rear horizontal leg 100.

An insertion limiting protuberance 102 is carried on the top surfaces of both horizontal legs 97 and 100 to prevent horizontal legs 97 and 100 from sliding too far into the interior channels of outrigger supports 55 and 61 respectively, which might allow the outrigger assembly 3 to strike the outer side of a pickup box to cause damage thereto.

Upwardly opening "U" shaped outrigger channel 103 is carried on the upper surface of elongate beam 95 to prevent lateral movement of a snowmobile ski or ATV wheel carried in therein. This structure allows a snowmobile ski or ATV wheel to be securely supported outwardly of and spacedly below the uppermost edge of the pickup box side.

A transition angle assembly 108 is carried at the rearward portion of the "U" shaped outrigger channel 103. The transition angle assembly 108 has a cross section similar to the "U" shaped outrigger channel 103, but has a downward angulation in its medial portion. The transition angle assembly 108 guides a ski of a snowmobile or wheels of an ATV into the "U" shaped outrigger channel 103 as the recreational vehicle move from ramp 7 onto transport platform 2 and outrigger assembly 3.

Figure 7:
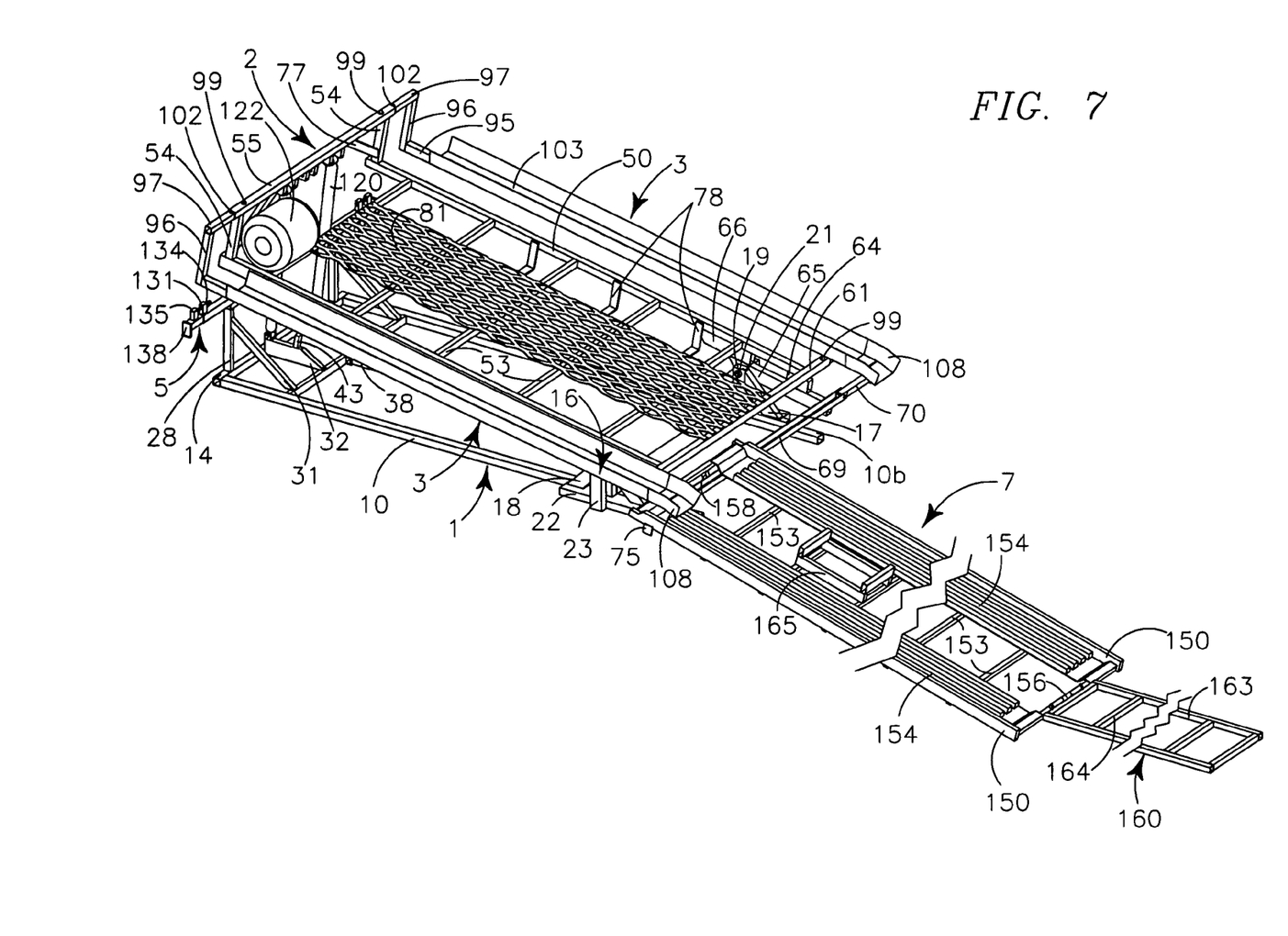
FIG. 7 is a partial left side forward looking isometric view of the base, transport platform, outrigger assemblies, ramp and extendable traction pad in an inclined loading and unloading orientation.

As shown in FIGS. 2, 4 and 7, the tilting mechanism 4 is comprised of at least one pneumatic cylinder 120 pivotally carried by axles 59 journaled by pneumatic cylinder mounting brackets 33 carried by the pneumatic cylinder supports 32, and pneumatic cylinder mounting brackets 57 depending from the forward outrigger support 55.

Pressurized air is supplied to pneumatic cylinder 120 from pressurized air tank 122 releasably carried on transport platform 2 and positionally maintained by mounting brackets 60 carried by beam 50 and forward crossbeam 53 of the transport platform 2. The pressurized air tank 122 communicates with pneumatic cylinder 120 by known hoses, fittings and control valves.

Figure 8:
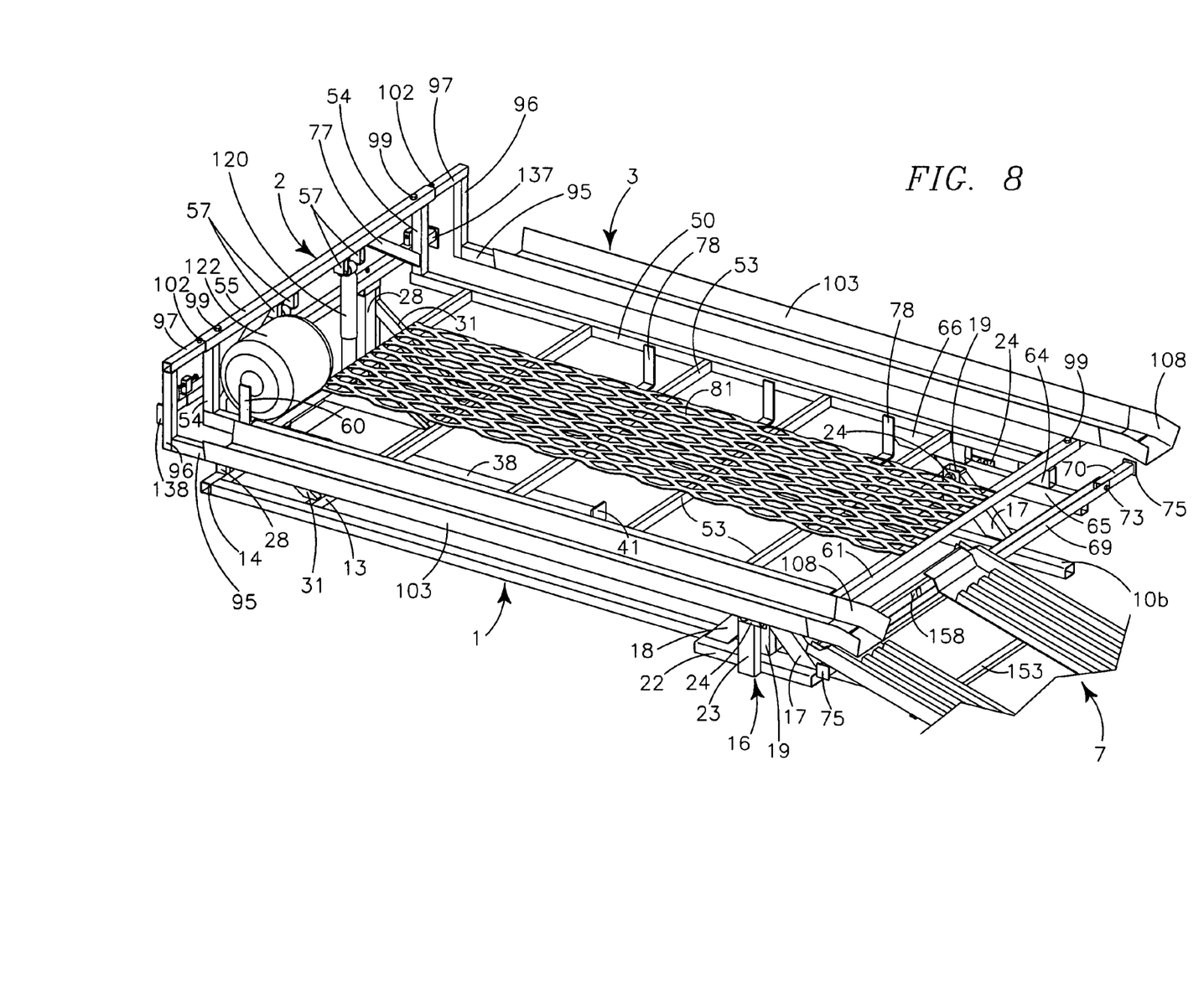
FIG. 8 is an enlarged partial left side forward looking isometric view of the base, transport platform and outrigger assemblies in a transporting orientation.
Figure 9:
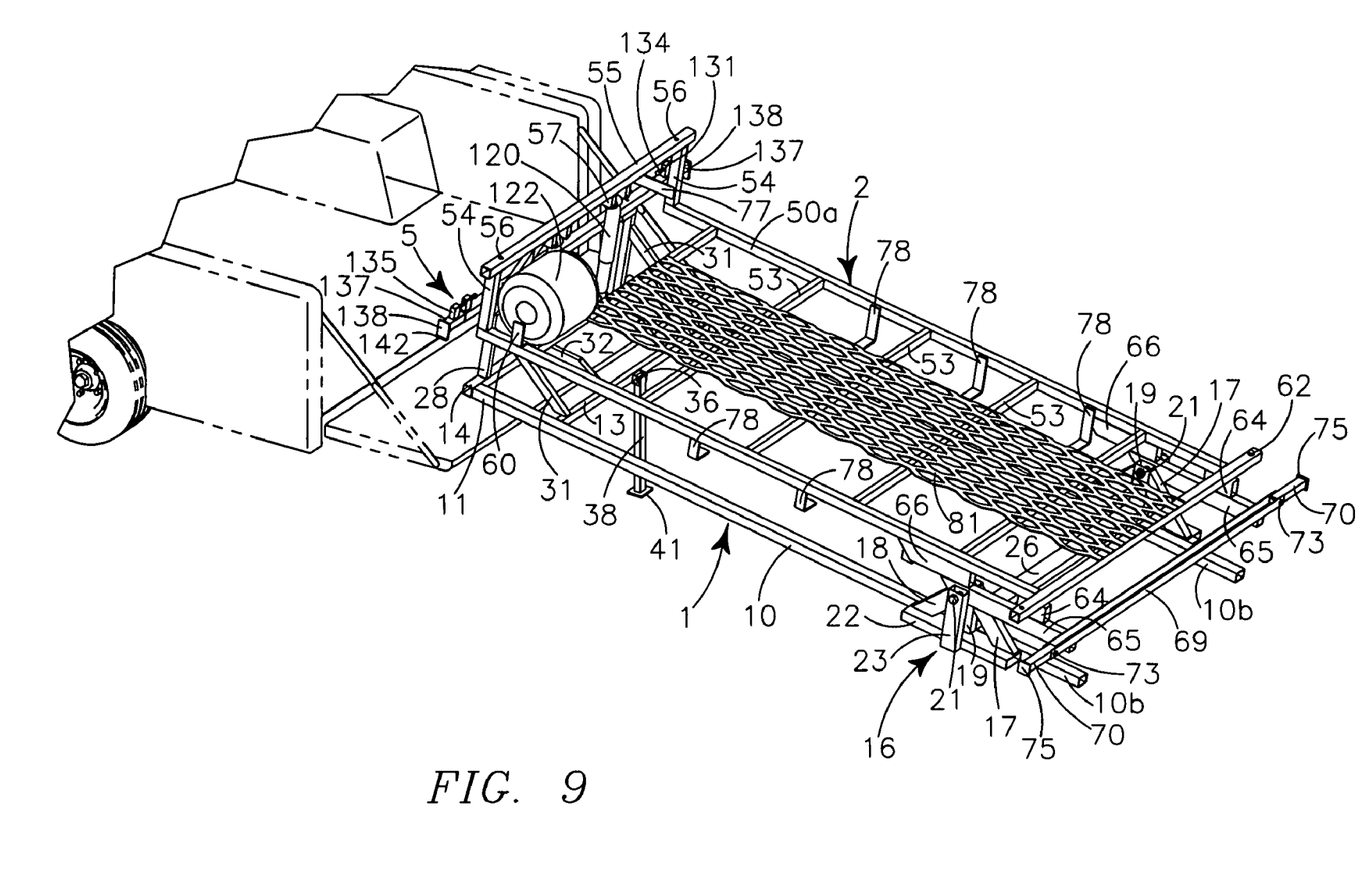
FIG. 9 is a left side forward looking isometric view of the base and the transport platform in position for loading into or unloading from a pickup box.

As shown in FIGS. 7 and 8 transport platform 2 is pivotally connected to the base 1 by bolt-type axles 21 extending through orifices 20 in the upwardly extending axle mounting arches 16 of the base 1 and through orifices 67 defined in the axle mounting arches 63 of the transport platform 2 and secured in place with a nut type fastener with securing pin of known construction (not shown).

An elevation locking mechanism 119 (FIG. 2) communicates between the forwardmost crossbeam 14 of the base 1 and the forward outrigger support 55 of the transport platform 2. The elevation locking mechanism 119 is comprised of two elongate box beam members 126, 127 which slidably engage with each other. The male member 126 and female member 127 define plural vertically spaced orifices 129 extending therethrough to receive locking pin 128 of known construction which is preferably biased toward a locking position. Female member 127 of elevation locking mechanism 119 is pivotally connected to forwardmost crossbeam 14 at the forward portion of the base 1 by axle 80 (FIG. 2) journaled in axle mounting brackets 42, and male member 126 is pivotally connected to the transport platform 2 by axle 83 (FIG. 4) journaled in axle mounting brackets 84 depending from forward outrigger support 55.

Figure 3:
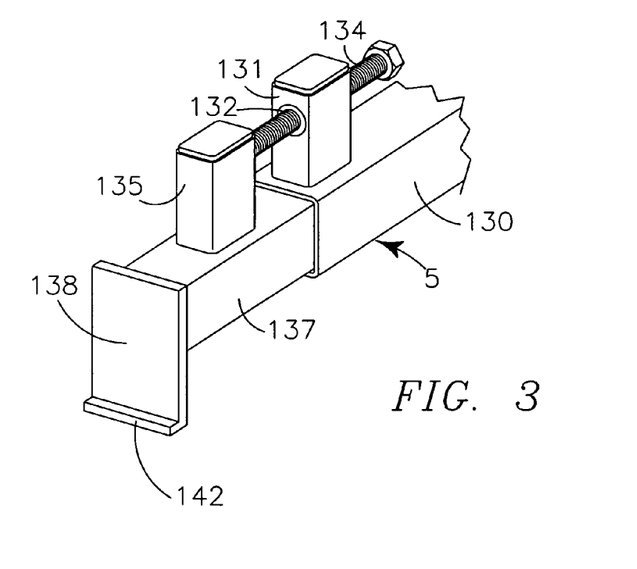
FIG. 3 is a partial isometric view of a laterally extending end piece of the forward securing mechanism.

As seen in FIGS. 2, 3 and 7 forward securing mechanism 5 provides elongate box beam 130 carrying at each end laterally extending end pieces 137, having cross sectional configurations to slidably fit within the channel of the box beam 137.

Rectilinear plates 138 having a nonskid type coating on their laterally outer surfaces for frictional communication with the inner side walls of a pickup box are carried at the laterally outer end of each end piece 137. Rectilinear plates 138 may also define a laterally outward extending shelf 142 along a horizontal edge to aid frictional engagement with the pickup box sides. Protuberance 135 is structurally carried on the top surface of laterally extending end piece 137 spacedly adjacent rectilinear plate 138 to communicate with a threaded tensioning bolt 134 of the forward securing mechanism 5.

As shown in FIG. 3, a protuberance 131 defining internally threaded orifice 132 axially aligned with beam 130 is structurally carried on the top surface of beam 130 inwardly adjacent each end. Threaded tensioning bolts 134 are engaged in orifices 132 to communicate with the protuberances 135 on the laterally extending end pieces 137 so that motion of tensioning bolts 134 force the laterally extending end pieces 137 outwardly to frictionally engage with the inner walls of a pickup box.

Orifices 136 are defined vertically through box beam 130 to receive securing pins 141. Beam 130 is positioned between the inner walls of a pickup box and directly above securing tower 27 so that pins 141 extend through orifices 136 in beam 130 and orifices 30 in upper horizontal member 29 of securing tower 27 to positionally maintain base 1.

Figure 10:
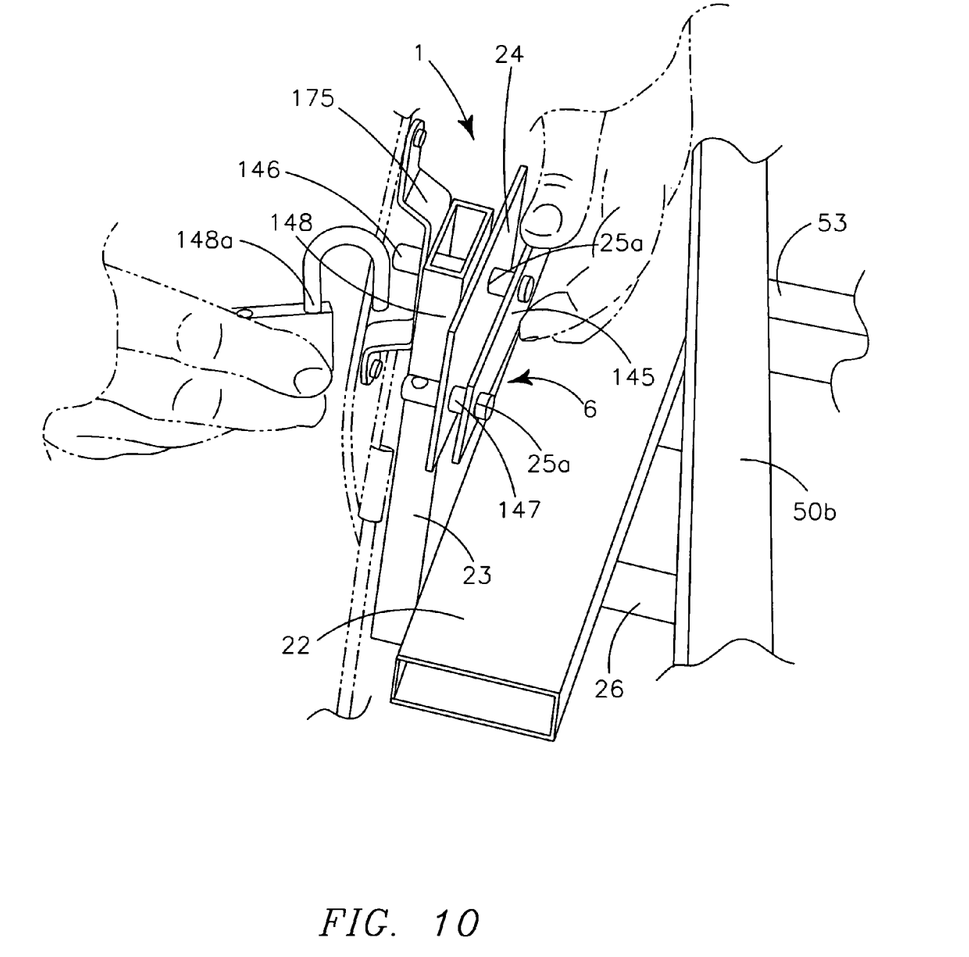
FIG. 10 is an enlarged partial isometric view of the rear securing mechanism on the left side rear corner of the pickup truck showing its structure and installation.
Figure 11:
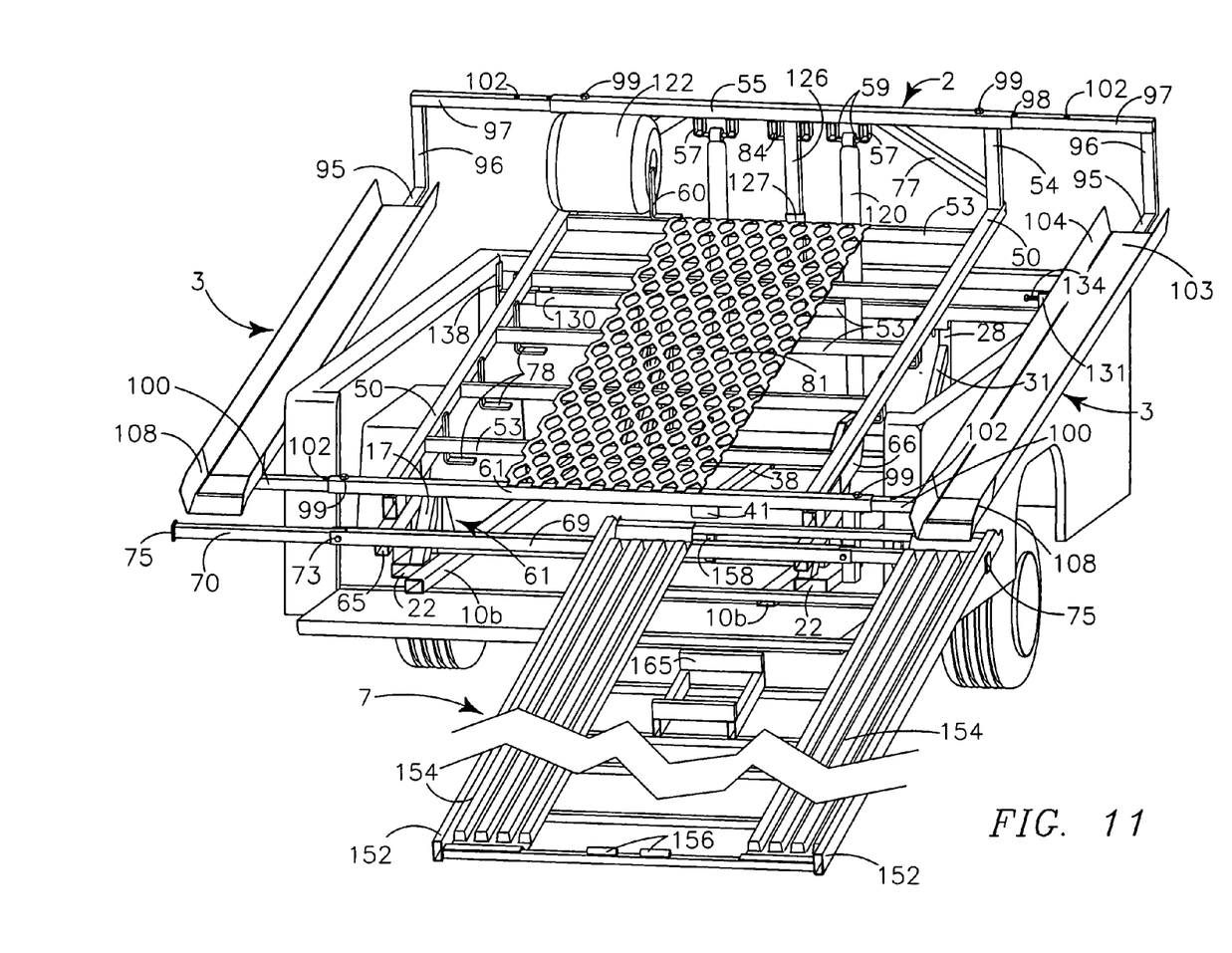
FIG. 11 is a partial right side forward looking isometric view of the transport platform and loading ramp in an inclined loading and unloading position.
Figure 12:
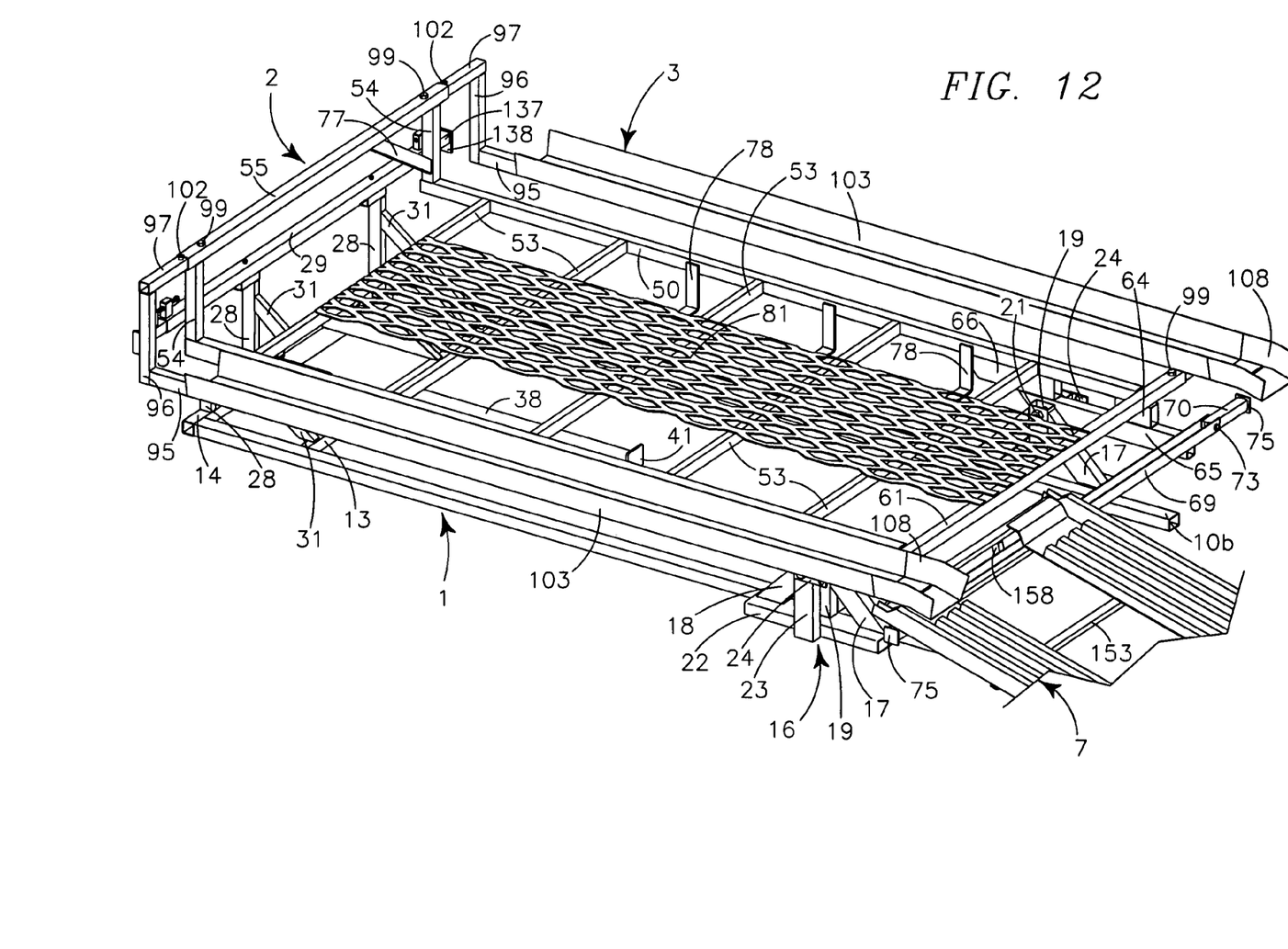
FIG. 12 is a partial left side forward looking isometric view of a non-pivoting species of the transport platform.

As seen in FIG. 10 rear securing mechanism 6 provides rectilinear plate 145 carrying two structurally attached perpendicularly extending pins 146 and 147, with pin 146 longer than pin 147. Pin 146 extends through orifice 25a in rectilinear plate 24, through outer vertical member 23 of base 1 and into tailgate locking bracket 175 carried by a pickup box. Pin 147 defines diametrically extending orifice 148 in its end portion distal from rectilinear plate 145 to carry padlock 148a or similar locking device to secure the rear portion of the base 1 and transport platform 2 in a pickup box.

Figure 5:
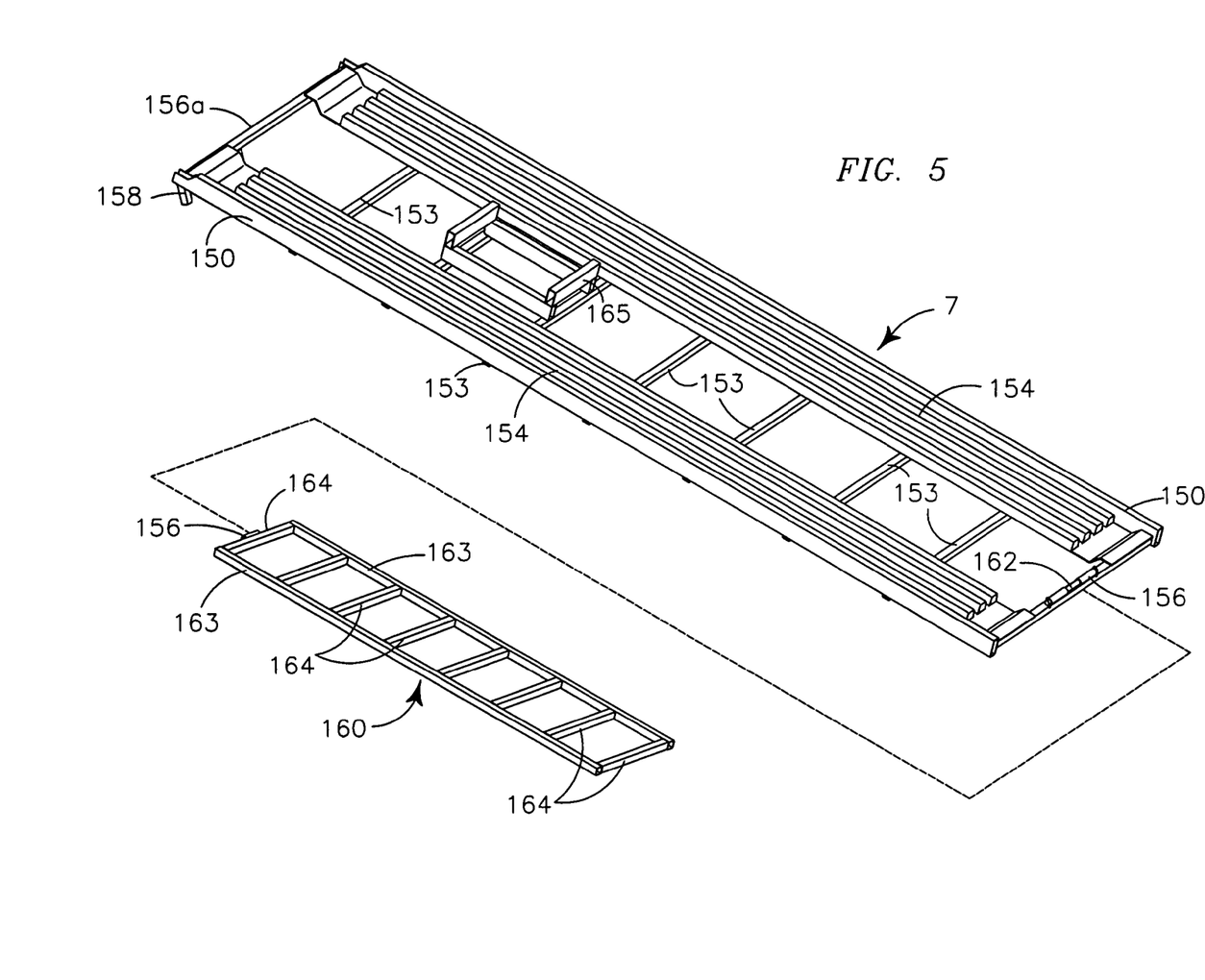
FIG. 5 is a left side forward looking isometric view of the loading and unloading ramp and the extendable traction pad.

As seen in FIG. 5, ramp 7 is a ladder-like structure comprised of similar side beams 150 interconnected by plural crossbeams 153 extending perpendicularly therebetween. In the preferred embodiment, two similar pieces of rigid decking 154 extending substantially the length of ramp 7 are releasably secured to crossbeams 153 inwardly adjacent side beams 150 to aid passage of snowmobile skis and ATV wheels up and down ramp 7. The medial elongate portion of ramp 7 between the two decking portions 154 remains uncovered to carry the track of a snowmobile traversing the ramp. Two legs 158 depend from structural support on forwardmost crossbeam 153 of the ramp 7 spacedly adjacent the opposing lateral ends. The forward end of the ramp 7 rests on the ramp support 69 and upon the extended pivoting beam extension 70 shown in FIG. 4. The legs 158 prevent ramp 7 from moving rearwardly and possibly disengaging from the ramp support 69. Flanges 75 carried by the pivoting beam extensions 70 seen in FIG. 4 prevent ramp 7 from moving laterally outwardly.

Transition angle reducer 165 structurally carried on the upper surface of the ramp 7 is formed of four box beam segments structurally interconnected to form a rectilinear member that is used to elevate the track portion of a snowmobile after the skis of a snowmobile have passed forwardly of transition angle reducer 165. Elevation of the track portion of a snowmobile decreases the transitional angle between ramp 7 and transport platform 2 and outrigger assembly 3 to increase the safety of loading and unloading.

As shown in FIG. 5, extendable traction pad 160 having a ladder-like structure formed by elongate side members 163 interconnected by perpendicular cross members 164 extending therebetween is pivotally connected to the rearward most crossbeam 153 of ramp 7. This pivotal interconnection is accomplished by engaging axle 162 carried in axle brackets 156 on the rearmost crossbeam 153 and axle brackets 156 carried on forwardmost crossmember 164 of traction pad 160.

Having described the structure of my recreational vehicle loading and transport platform for pickup trucks its operation may be understood.

The forward end of the base 1 and transport platform 2 that will be closest to the pickup cab is lifted vertically allowing elongate leg 38 to rotate downwardly into a vertical position against the rotation limitation stopper 40 so that the forward end of the base 1 and transport platform 2 are supported by the elongate leg 38 at a height above the lowered pickup tailgate.

The pickup is positioned so the lowered tailgate is under the forward end of the base 1 and aligned so side beams 10 of base 1 may move forward inwardly of the wheel well covers of the pickup bed.

The rearward end portion of base 1 and the connected transport platform 2 are lifted into horizontal alignment with the bottom of the pickup bed and moved forwardly into the pickup box. When correctly positioned, forward vertical members 28 of securing tower 27 are in physical contact with, or are in close proximity to, the forward wall of the pickup box, and side beams 10 of the base 1 are adjacent to and inwardly adjacent the wheel well covers.

Forward securing mechanism 5 is positioned between the inner walls of the pickup box and directly above securing tower 27 of base 1. Securing pins 141 are inserted into the aligned orifices 136 and 30 extending through elongate beam 130 and upper horizontal member 29 of securing tower 27. Threaded tensioning bolts 134 of the forward securing mechanism 5 are rotated forcing laterally extending end pieces 137 laterally outwardly into contact with the inner walls of the pickup box.

Rear securing mechanism 6 (FIG. 10) is installed at each of the rearward corners of base 1. Pin 146 extends through orifice 25a in the rectilinear plate 24 and through the outer vertical member 23 to engage with tailgate locking bracket 175 of the pickup box. Pin 147 extends through orifice 25b defined in the rectilinear plate 24 and a securing pin or padlock 148a is inserted through the diametrically extending orifice 148 outward of the rectilinear plate 24 securing the rearward corners of the base 1 into the pickup box.

Forward horizontal legs 97 and rear horizontal legs 100 of outrigger assembly 3 are aligned and inserted into the medial channels defined by the respective outrigger supports 55 and 61 and securing pins 99 are inserted through paired opposed orifices 56, 98, and 62, 101 to secure outrigger assembly 3 in position. Pivoting beam extensions 70 of the ramp support 69 are pivoted upwardly and outwardly to support the forward portion of ramp 7 when aligned with outrigger assembly 3.

The forward end of the ramp 7 is positioned with the depending legs 158 on the forward side of the ramp support 69. Ramp 7 is moved laterally so that the outermost edge is in contact with the flange 75 of extended pivoting beam extension 70. Extendable traction pad 160 is pivoted to extend rearwardly from the ramp 7.

Locking pin 128 of the elevation locking mechanism 119 is disengaged and the valving system on the pressurized air tank 122 is activated to allow compressed air to flow to pneumatic cylinder 120 causing the forward end of transport platform 2 to rise relative to the base 1. When transport platform 2 has been elevated to its maximum height the locking pin 128 is reinstalled in the elevation locking mechanism 119.

A recreational vehicle (not shown) is positioned on extendable traction pad 160 and moved by its own power, manually, or by auxiliary power over the extendable traction pad 160, up ramp 7 and onto transport platform 2 and outrigger assembly 3. The outer ski of a snowmobile or outer wheels of an ATV, are carried within the "U" shaped outrigger channel 103 of the outrigger assembly 3.

The snowmobile or ATV is moved forward to the forward end portion of the transport platform 2 where recreational vehicle is secured in place by known means.

Ramp 7 may be moved laterally so that a second recreational vehicle may be loaded adjacent the first, in the same manner.

Once the recreational vehicles are loaded and secured locking pin 128 on the elevation locking mechanism 119 is disengaged and the pneumatic cylinder valves activated to allow pressurized air to escape from the pneumatic cylinder 120 to responsively allow the forward end of the transport platform 2 to move downwardly in relation to the base 1. The locking pin 128 is reinstalled to maintain this transportation mode of the transport platform.

Extendable traction pad 160 on ramp 7 is rotated forwardly to rest on the top surface of the ramp 7 and the ramp is moved into position between the side beams 50 of the transport platform 2. The rear portion of ramp 7 is lifted and the ramp is moved forwardly onto plural depending "L" shaped hangers 78 of transport platform 2 where ramp 7 is secured in place by known means.

Pivoting beam extension 70 at each end of ramp support 69 are rotated upwardly and inwardly and are secured in place by known means.

Unloading of the snowmobile or ATV is performed by reversing the above described operations.

The foregoing description of my invention is necessarily of a detailed nature so that a specific embodiment of its best mode may be set forth as is required, but it is to be understood that various modifications and details, and rearrangement, substitution and multiplication of parts may be resorted to without departing from its spirit, essence or scope.

Having thusly described my invention, what I desire to protect by Letters Patent, and

What I claim is:

1. A loading and transport platform for pickup trucks to carry two recreational vehicles in elongate alignment and lateral adjacency partially within a pickup box, comprising in combination:
   (a) a base, formed by spaced parallel elongate side beams structurally interconnected by crossbeams to define forward and rearward end portions, carried within the pickup box and having
      an upstanding securing tower structurally carried by the forward end portion of the base and having an upper horizontal member for releasable attachment of a forward securing mechanism,
      similar paired opposed upstanding vertical members carried at each rearward end portion of each side beam, each vertical member carrying a plate having means for engaging with a rear securing mechanism to releasably interconnect the vertical members to the pickup box, and
      an upwardly extending axle mounting arch having similar lateral end portions each defining orifices to journal bolt type axles to pivotally support a transport platform;
   (b) a loading and transport platform, pivotally carried by the base to extend thereabove, within the pickup box having
      similar paired opposed parallel side beams structurally interconnected by plural spaced perpendicular cross beams to define forward and rearward end portions,
      similar opposed axle mounting arches each defining an orifice to journal a bolt type axle connecting each axle mounting arch of the transport platform to each associated upwardly extending axle mounting arch of the base,
      a forward outrigger support carried by the forward end portion of the transport platform spacedly thereabove to extend perpendicular to the transport platform side beams,
      a rearward outrigger support carried by the rearward end portion of the transport platform at a vertical level below the forward outrigger support to extend parallel thereto, and
      an elongate ramp support carried at the rearward end of the transport platform to extend perpendicular to the transport platform side beams, the ramp support having pivoting extensions at respective lateral ends thereof to increase the length of the ramp support;
   (c) at least one outrigger assembly carried by the transport platform outwardly of the upper edges of a pickup box side, each outrigger assembly having
      an elongate beam having forward and rearward end portions,
      a rearward horizontal leg to slidably engage within the rear outrigger support of the transport platform, and
      a forward horizontal leg, vertically above the rearward horizontal leg and extending parallel to the rearward horizontal leg, to slidably engage in the forward outrigger support of the transport platform;
   (d) a forward securing mechanism having an elongate box beam releasably carried by the upper horizontal member of the securing tower to extend parallel thereto within the pickup box, said box beam having
      laterally extending end pieces slidably carried in a medial channel at each end, and
      tensioning bolt means communicating between the elongate box beam and at least one of the laterally extending end pieces to adjustably extend the at least one end piece to cause the box beam to be frictionally engaged between pickup box sides for positional maintenance of the securing mechanism in the pickup box;

(e) a rearward securing mechanism having a plate, carried by an inner vertical member of the upwardly extending axle mounting arch, and structurally carrying pin means to engage with tailgate locking brackets of the pickup box to positionally maintain and releasably lock the base in the pickup box; and (f) a loading and unloading ramp releasably attachable to the rearward portion of the transport platform to aid loading and unloading of a recreational vehicle between the ground and the transport platform.

2. The loading and transport platform of claim 1 having a tilting mechanism to elevate the forward portion of the transport platform relative to the base comprising:

at least one pneumatic cylinder pivotally interconnecting the base and the transport platform, and a source of pressurized air carried by the transport platform pneumatically communicating through control means with the at least one pneumatic cylinder.

3. The loading and transport platform of claim 1 further comprising:

an elongate leg pivotally carried by a forwardly medial crossbeam of the base to depend therefrom, said elongate leg carrying a weighted foot plate weight biased toward a vertical orientation;

an outrigger channel carried on the elongate beam of the outrigger assembly to receive and guide earth contacting elements of recreational vehicles; and a transition angle assembly carried at a rearward end portion of the outrigger channel to guide a snowmobile ski and ATV wheel into the outrigger channel.

4. The loading and transport platform of claim 1 further comprising:

the loading and unloading ramp releasably carried by the rearward portion of the loading and transport platform and releasably carrying a transition angle reducer assembly extending spacedly upward from the medial forward portion of the loading and unloading ramp to contact the track of a snowmobile passing thereover to decrease the transition angle between the ramp and the transport platform; and an extendable traction pad releasably pivotally connected to the rearward end of the loading and unloading ramp by an axle carried by axle mounting brackets on a most rearward crossbeam.

5. A loading and transport platform for pickup trucks to carry two recreational vehicles in elongate alignment and lateral adjacency partially in a pickup box, comprising in combination:

(a) a base having spaced parallel elongate side beams structurally interconnected by plural perpendicular cross beams to define forward and rearward end portions, an upstanding securing tower structurally carried by the forward end portion of the base to engage with a forward securing mechanism, upright vertical members structurally carried by spacer members carried at each rearward end portion of each side beam, each upright vertical member extending adjacent to tailgate locking brackets of the pickup box and carrying a plate having means to engage with rear securing mechanism, an elongate leg pivotally carried by a forwardly medial crossbeam of the base to depend therefrom, said elongate leg carrying a weighted foot plate that is weight biased toward a vertical orientation, and upwardly extending axle mounting arches having similar lateral portions each defining an orifice to journal a bolt type axle to pivotally carry platform;

(b) a loading and transport platform, pivotally carried by the base, to extend thereabove disposed within the pickup box, having similar paired opposed parallel side beams structurally interconnected by plural spaced perpendicular cross beams to define forward and rearward end portions, similar opposed depending axle mounting arches each structurally outrigger assembly comprising an elongate beam having a forward and rearward end portion, releasably carrying a "U" shaped outrigger channel thereabove to direct movement of a ground contacting element of a recreational vehicle, a transition angle assembly carried at the rearward end portion of the outrigger assembly elongate beam to guide a ground contacting element of a recreational vehicle into the "U" shaped channel, a perpendicular laterally inwardly extending rear horizontal leg carried by the rearward end portion of outrigger assembly elongate beam to fastenably engage with the rearward outrigger support of the transport platform, and a forward horizontal leg vertically above the rear horizontal leg and extending laterally inwardly parallel to the rear horizontal leg, structurally carried at top end portion of a vertical leg carried at the forward end portion of outrigger assembly elongate beam, to fastenably engage with the forward outrigger support of the transport platform;

(d) a tilting mechanism pivotally interconnecting the forward the portion of the transport platform and the forward portion of the base to elevate the carried spacedly adjacent the rearward end portions of each opposed side beam defining an orifice to journal a bolt type axle connecting each depending axle mounting arch of the transport platform to each associated upwardly extending axle mounting arch of the base, a forward outrigger support carried by the forward end portion of the transport platform spacedly thereabove to extend perpendicular to the transport platform side beams, a rearward outrigger support carried by the rearward end portion of the transport platform at a vertical level below the forward outrigger support to extend parallel thereto, and an elongate ramp support extending between the rearward end portions of lower horizontal members of the depending axle mounting arches, the ramp support having pivoting beam extension at respective ends lateral to increase the length of the ramp support, each pivoting beam extension carrying a flange at a laterally outer end;

(c) at least one outrigger assembly carried by the transport platform outwardly of and below the upper edge of at least one pickup box side, each forward portion of the transport platform relative to the base, the tilting mechanism comprising at least one pneumatic cylinder pivotally interconnecting the forward portion of the base and the forward portion of the transport platform and a source of pressurized air carried by the transport platform pneumatically communicating through control means with the at least one pneumatic cylinder;

(e) a forward securing mechanism having an elongate box beam releasably carried by an upper horizontal member of the securing tower to extend parallel thereto within the pickup box, said box beam having laterally extending end pieces slidably carried in a medial channel at each end of the elongate box beam, each end piece carrying a plate at the laterally outer end for frictional engagement with an inner side of the pickup box and a protuberance spacedly adjacent the end opposite the end piece plate for engagement with a threaded securing bolt, a protuberance structurally carried spacedly adjacent each end of the elongate box beam, each box beam protuberance defining an internally threaded orifice carrying a threaded tensioning bolt for engagement with the respective protuberance carried on the adjacent laterally extending end piece;

(f) a rearward securing mechanism to fasten rearward corners of the base to tailgate locking brackets carried by the pickup box comprising a plate structurally carrying two spacedly adjacent parallel pin means to engage with tailgate locking brackets of the pickup box to positionally maintain and releasably lock the base in the pickup box; and (g) a loading and unloading ramp releasably attachable to the rearward portion of the transport platform to aid loading and unloading of a recreational vehicle between the ground and the transport platform comprising two elongate spaced parallel side beams interconnected by plural crossbeams carrying elongate decking at lateral portions to support ground contacting elements of recreational vehicles, a transition angle reducer assembly carried in the forward medial portion of the loading and unloading ramp laterally inwardly of the decking to extend spacedly upwardly to contact a track of a snowmobile passing thereover to decrease the transition angle between the loading and unloading ramp and the transport platform, and an extendable traction pad releasably pivotally connected to the rearward end of the loading and unloading ramp by an axle carried by axle mounting brackets on a most rearward one of said crossbeams of said ramp.

* * * * *